AIR BEARING MAGNETIC HEAD MOUNTING

Filed July 6, 1964

INVENTORS
JOHANNES A. VAN LAMMEREN
GEORGIUS BARNIER
JACOB KOORNEEF
JULES BOS
BY
Frank R. Trifari
AGENT

United States Patent Office 3,351,925
Patented Nov. 7, 1967

3,351,925

AIR BEARING MAGNETIC HEAD MOUNTING

Johannes Antonius van Lammeren, Georgius Barnier, Jacob Koorneef, and Jules Bos, Emmasingel, Eindhoven, Netherlands, assignors to North American Philips Company, Inc., New York, N.Y., a corporation of Delaware Filed July 6, 1964, Ser. No. 380,438
Claims priority, application Netherlands, July 4, 1963, 294,936
12 Claims. (Cl. 340—174.1)

This invention pertains to a mount or holder for a magnetic head of a plurality of magnetic heads which cooperate with a record carrier moving at a high speed with respect to the heads.

Generally, the record carrier is constituted by a drum or disc having a layer of magnetizable material on its surface. In operation, the position of the head in the direction of movement of the carrier and in a direction at right angles thereto, as well as the distance from the front face of the head to the magnetizable layer, are determined by the pressure of a gas which is produced between the head and the carrier as a result of the movement of the carrier with respect to the head. At certain relatively low speeds of the carrier, auxiliary means may be used to produce the gas pressure; in either case the gas is generally and preferably air. The gas creates a laminar fluid boundary between the record carrier and the head; the head is sometimes referred to in the art as floating on said fluid boundary.

Various mountings have been devised for mounting or holding a magnetic head or a plurality of such heads operating in the environment described above. One such arrangement consists of suspending the head in a fork which is connected by means of a spring to a suspension member; the latter is rotatable with respect to a fixed shaft which, however, is manually adjustable in accordance with a guide member which is fixed in position.

However, it will be appreciated that very small adjusting forces are involved in adjusting the position of the head; even with the most precise structure in a device of the above kind, the friction at the two points of rotation of the suspension member will be too great relative to the comparatively small adjusting forces to permit an adjustment of the head relative to the carrier with a tolerance of a few microns. Also, the head must be capable of responding rapidly to any irregularities in the mechanical finish of the carrier while maintaining the distance from the head to the carrier substantially constant; even with the most precisely finished apparatus, these irregularities are inevitably present and may amount to a few microns. It will be appreciated that these desiderata require that any inertia forces produced as a result of movement of the head be as small as possible. With known head mounts, it is difficult if not impossible to meet these requirements.

Among the objects of the invention are the following:

To provide a mount for a magnetic head or heads operating in the above-described environment wherein frictional forces in the mount due to movement of the head are reduced to a minimum;

To provide a mount for a magentic head or heads operating in the above-described environment wherein acceleration forces due to adjusting the head during operation are reduced to a minimum; and To provide a mount for a magnetic head or heads wherein frictional and acceleration forces are kept to a minimum with structure which is comparatively simple and inexpensive to build and is reliable in operation.

Briefly, a mount according to the invention includes a knife-edged support on which the head bears. The term "head" as used herein includes both a single head and a plurality of heads included as a group in a suitable casing.

The head is preferably of generally rectangular cross-section and has stops on both sides at the end remote from the carrier. These stops co-act with a wall of the mount to prevent the head from resting on the carrier when the latter is stationary. An adjustable flexible member is included in the holder which acts to urge the head toward the carrier. This action is achieved by means of a pressure member located between the flexible member and the rear end of the head which allows the movement of the head in all directions with respect to the carrier; the pressure member is arranged so that the pressure exerted on the head has a component which, with a given direction of movement of the carrier, is always parallel to this direction of movement and at right angles to the knife-edged support. The frictional forces to be overcome with the movement of the head are thus reduced to a minimum, while a satisfactory and well-defined support for the head is also obtained. In addition, the acceleration forces occurring when adjusting the head during operation are at a minimum.

According to another feature of the invention, the holder may also include an additional knife-edged support on a side wall of the holder opposite that of the above-mentioned knife-edged support, the head being located between the two supports with a slight amount of clearance. Thus, the amount of friction between the head and the holder is kept at a minimum even when the head takes a somewhat oblique position.

The pressure member may take any of several different forms. A ball or universal joints may be used, for example. According to a preferred embodiment, however, this member is constituted by a pressure rod which is movable in all directions both with respect to the head and to the flexible member. This structure is advantageous in that it is inexpensive and can be easily mounted, while the frictional forces to be overcome are very low.

The foregoing and other objects and features of the invention will be better understood from the following description, when taken with reference to the accompanying drawing, in which.

Figure 1:
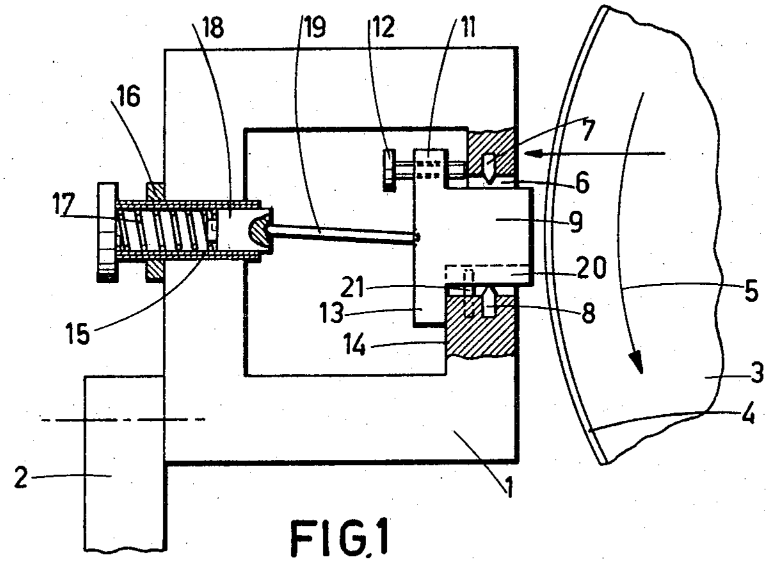
FIG. 1 is a sectional view of a holder for a magnetic head or heads cooperating with a drum-shaped record carrier shown diagrammatically.

In the figures, wherein like reference numerals refer to like elements, reference numeral 1 denotes generally a holder secured to a fixed member or arm 2. A drum-shaped record carrier 3 provided with a layer of magnetizable material 4 rotates in the direction indicated by the arrow 5 along the front part of the holder 1. A rectangular aperture 6 is located in the front part of the holder; on the upper side and the lower side respectively of the aperture 6 there are provided two knife-shaped supports 7 and 8. As can be seen from FIG. 1, the holder 1 has a wall portion 14 and the aperture 6 extends entirely through the front portion of the wall from the front of the holder. A multiple magnetic head 9 comprising eight separate recording and/or reproducing elements 10 is disposed between the knife-shaped supports 7 and 8. Reference numeral 30 denotes the effective gaps of the heads. These gaps may be in line as shown or may have any other desired interrelationship. A multiple magnetic head is shown for illustrative purposes only; as stated above, the invention is equally applicable to apparatus wherein element 9 is constituted by a single head. Similarly, eight separate recording elements are shown for illustrative purposes only; any number of heads can be utilized as desired. The head 9 may be generally rectangular in shape and is provided on its upper surface remote from the carrier with a stop 11 co-acting with an adjustable abutment screw 12. Similarly, a stop 13 is provided on the lower surface remote from the carrier; the dimensions of the various elements are such that the stop 13 abuts the wall 14 as shown in FIG. 1 when the drum is stationary. At the rear portion of the holder, a hollow screw sleeve 15 is provided in the wall 14; the screw sleeve 15 is adjustable transversely of the wall and can be fixed in position by a nut 16. A compression spring 17 is disposed in the screw sleeve 15. A piston 18 is also located in the screw sleeve 15 and, as can be seen, the spring 17 exerts a pressure on the piston 18. A pressure rod 19 is coupled between the piston 18 and the head 9. The pressure rod 19 has tapering ends which are disposed in corresponding recesses in the piston and in the rear wall of the head 9. A rectangular groove 20 extending parallel to the pressure rod 19 is formed in the lower surface of the head 9 and a round pin 21 is rigidly placed in the wall 14 at the lower side of the aperture 6. As can be seen, the pin 21 extends into the aperture 6 and into the groove 20 with a very small amount of clearance.

The head 9 is shown in the position which it occupies when the drum 3 is stationary. When the drum starts rotating, for example, at a high speed of 3000 r.p.m., an air pressure is produced between the front face of the head 9 and the drum surface. As a result, the head tends to shift to the left against the pressure of the spring 17. However, it is important that the position of the head in the direction of movement of the drum 3, i.e., the direction of the arrow 5, change as little as possible during this displacement; in order to achieve this, the pressure rod 19 is arranged so that its longitudinal axis is at a small sharp angle to the normal on the carrier surface. Further, the rod, the said normal and the direction of movement of the carrier at the point where the normal touches the carrier surface are co-planar. As a result, the pressure of the spring 17 is given a component in the direction of movement of the record carrier; this component forces the head 9 constantly on the knife-edged support 8. However, since the support 8 is knife-edged, only a very small amount of friction is produced by this component during the movement of the head 9, so that the adjustment of the head due to the movement of the carrier involves only a very small amount of force.

Figure 2:
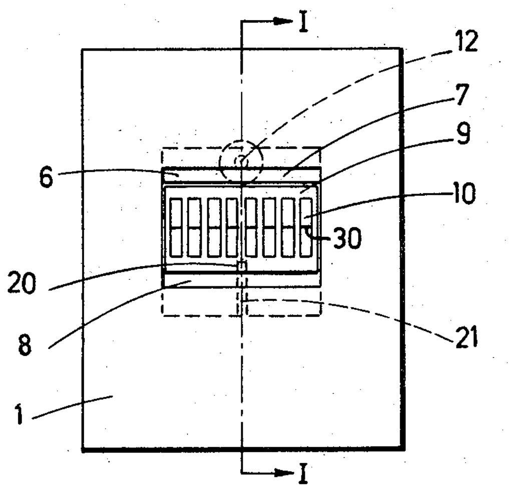
FIG. 2 is an elevation of the holder of FIG. 1, viewed in the direction of the arrow shown in FIG. 1.

As stated above, it is necessary that the elements of the head also be adjustable in a direction at right angles to the direction of movement of the carrier to compensate for the almost inevitable irregularities in the carrier. Since the distance between the recording tracks on the carrier is generally of the order of 0.3 mm. and the track width is 0.2 mm., while the gap width of an element 10 itself does not exceed approximately 0.3 mm., the head 9 must not be allowed to move to the right-hand or to the left-hand side as seen in the view of FIG. 2, but the head must be capable of performing a rotary movement. This rotary movement and restriction of translational movement is rendered possible by the groove 20 extending parallel to the pressure rod 19 and cooperating with the pin 21. As already stated, the pin 21 fits with the greatest possible accuracy in the groove 20 and consequently, it is possible for the head 9 nevertheless to rotate around the pin 21 in substantially every position on the left-hand side in FIG. 1, without changing the correct position of the separate elements 10 with respect to the recording tracks.

It is also possible to obtain a slight tilting movement of the head 9. The air cushion formed between the front face of the head and the record carrier during operation is wedge-shaped and it is therefore desirable that the front face of the head also be adjustable in the direction of movement of the carrier. This is possible since the distance between the knife edges or points of the supports 7 and 8 exceeds to some extent, as shown, the corresponding dimension of the head. The knife-edged support 8 then constitutes a tilting point of the head, and the downward component of the pressure of the spring 17 produced through the pressure rod 19 will constantly press the head 9 against the support 8.

Consequently, the head 9 is capable of moving in all directions except the translational one from left to right in FIG. 2, thus preserving the same relative position of the separate elements 10 with respect to the tracks on the record carrier 3. By a suitable proportioning of the whole and by a suitable location of the effective gaps 30, it is also possible to maintain constantly at a minimum the distances from the effective gaps in the elements of the head to the surface of the record carrier and to keep these distances less than the distances from the remaining parts of the head elements to the said surface; as a result, the recording and/or reproduction operations can be maintained at optimum conditions. Moreover, the frictional losses occurring with the adjustment of the head during operation are reduced to a very low value, so that the head may be very readily adjusted in operation. Since the piston 18 is a close fit in the screw sleeve 15, the movement of the head is given a distinct damping action so that undesirable oscillations are prevented; the slight amount of friction between the head and the support 8 also contribute to this desideratum. The point of application of the pressure rod to the surface of the head is determined empirically taking into account the angle of the air wedge which, as already stated, is produced during operation between the front face of the head and the carrier. As an example of a properly functioning mount, the following may be noted: with a given head whose front face had the dimensions 17 x 26 mm. and which contained 12 elements, and with a drum of 400 mm. diameter rotating at a rate of 3000 r.p.m., the point of application of the pressure rod was situated slightly below the center of the rear face of the head.

It is not necessary that the coupling between the piston 18 and the head 9 be a pressure rod. This coupling may comprise, for example, a ball or a universal joint. When the latter are used, however, the amount of friction produced in the system is higher, and it may also be necessary to secure for example to the piston 18 a leaf spring or the like, which spring bears on the head 9 and thus produces the downward component necessary for constantly forcing the head 9 against the knife-edged support 8.

Figure 3:
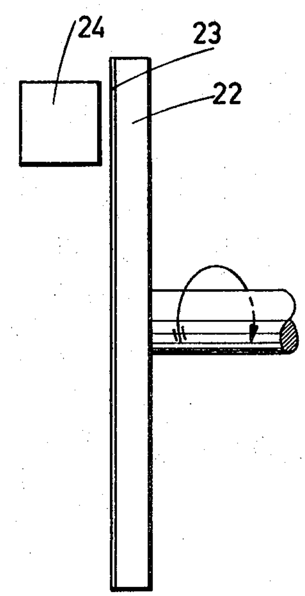
FIG. 3 shows diagrammatically the manner in which the holder may be arranged to cooperate with a disc-shaped record carrier.

The carrier 3 need not be drum-shaped; it may alternatively be in the form of a disc. Such an arrangement is shown diagrammatically in FIG. 3, wherein reference numeral 22 denotes the disc, with a recording layer 23 being provided on the disc. The holder with the head is shown as block 24 in FIG. 3 and is arranged in the position shown. In the embodiment of FIG. 3, the rapidly rotating disc 22 creates the air pressure. The holder itself operates the same as the holder 1 of FIGS. 1 and 2.

The record carrier may also comprise a tape which would replace the drum of FIG. 1 and move in the same direction of travel past the holder and head.

An advantage of the holder in accordance with the invention is that the external form of the head (or heads) may be very simple, and the dimensions need not be subject to strict tolerances. Moreover, the weight may be kept at a minimum, as a result of which the natural frequency of the floating system may be very high; this, in combination with the small amount of friction, allows the head to follow rapid fluctuations, if any, resulting for example from the non-circular shape of the drum.

A further advantage is that a plurality of heads, if desired multiple heads, can be positioned with respect to the same knife-edged support; the support, of course, must be suitably dimensioned in length. Consequently, if the effective gaps of all these multiple heads are equally spaced from the lower face, the head structure can be mounted in a simple manner. The arrangement also facilitates a simple and effective exchange of heads when necessary or desired.

Any quantitative values given above are provided only to enable ready practice of the invention, and are not meant to limit the scope thereof in any respect.

While the invention has been described with respect to specific embodiments, many modifications and variations thereof will readily occur to those skilled in the art without departing from the inventive concept, the scope of which is set forth in the appended claims.

What we claim is:

1. In combination: at least one magnetic head having a front face adapted to co-act with a moving magnetic carrier which creates a gas pressure between said front face and said carrier when in operation, and a rear face remote from said carrier, said head bearing on a fixedly arranged knife-edged support, an adjustable flexible member exerting a force from one end thereof, coupling means mechanically coupling said one end of the flexible member and the rear face of the head, said force being exerted on said head against said gas pressure when the carrier is moving, said coupling means creating a component of said force which is substantially parallel to the direction of movement of the carrier and substantially perpendicular to the knife-edged support, and stop means on said head co-acting with a fixed stationary member for limiting the distance of the head from the carrier when the carrier is stationary.

2. In combination: at least one magnetic head having a front face adapted to co-act with a moving magnetic carrier which creates a gas pressure between said front face and said carrier when in operation, a rear face remote from said carrier and top and bottom surfaces, said bottom surface bearing on a first fixedly arranged knife-edged support, an adjustable flexible member exerting a force from one end thereof, coupling means mechanically coupling said one end of the flexible member and the rear face of the head, said force being exerted on said head against said gas pressure when the carrier is moving, said coupling means creating a component of said force which is substantially parallel to the direction of movement of the carrier and substantially perpendicular to the first knife-edged support, a second fixedly arranged knife-edged support adjacent said top surface, said top and bottom surfaces being arranged between said knife-edged supports with a slight amount of clearance, and stop means on said head co-acting with a fixed stationary member for limiting the distance of the head from the carrier when the carrier is stationary.

3. In combination: at least one magnetic head having a front face adapted to co-act with a moving magnetic carrier which creates a gas pressure between said front face and said carrier when in operation, and a rear face remote from said carrier and top and bottom surfaces, said bottom surface bearing on a first fixedly arranged knife-edged support, an adjustable flexible member exerting a force from one end thereof, a pressure rod mechanically coupling said one end of the flexible member and the rear face of the head, said force being exerted on said head against said gas pressure when the carrier is moving, said pressure rod being adapted to move in all directions both with respect to the flexible member and the head and creating a component of said force which is substantially parallel to the direction of movement of the carrier and substantially perpendicular to the first knife-edged support, a second fixedly arranged knife-edged support adjacent said top surface, said top and bottom surfaces being arranged between said knife-edged supports with a slight amount of clearance, and stop means on said head co-acting with a fixed stationary member for limiting the distance of the head from the carrier when the carrier is stationary.

4. In combination: at least one magnetic head having a front face adapted to co-act with a moving magnetic carrier which creates a gas pressure between said front face and said carrier when in operation, and a rear face remote from said carrier, said head bearing on a fixedly arranged knife-edged support, an adjustable flexible member exerting a force from one end thereof, a pressure rod mechanically coupling said one end of the flexible member and the rear face of the head, said force being exerted on said head against said gas pressure when the carrier is moving, said pressure rod lying in a plane containing the normal to the carrier surface at substantially the portion of said carrier which co-acts with the head and the direction of movement of the carrier at said normal, said pressure rod making an angle to this normal and thereby creating a component of said force which is substantially parallel to the direction of movement of the carrier and substantially perpendicular to the knife-edged support, and stop means on said head co-acting with a fixed stationary member for limiting the distance of the head from the carrier when the carrier is stationary.

5. In combination: at least one magnetic head having a front face adapted to co-act with a moving magnetic carrier which creates a gas pressure between said front face and said carrier when in operation, and a rear face remote from said carrier and top and bottom surfaces, said bottom surface bearing on a first fixedly arranged knife-edged support, an adjustable flexible member exerting a force from one end thereof, a pressure rod mechanically coupling said one end of the flexible member and the rear face of the head, said force being exerted on said head against said gas pressure when the carrier is moving, said pressure rod lying in a plane containing the normal to the carrier surface at substantially the portion of said carrier which co-acts with the head and the direction of movement of the carrier at said normal, said pressure rod making an angle to this normal and thereby creating a component of said force which is substantially parallel to the direction of movement of the carrier and substantially perpendicular to the first knife-edged support, a second fixedly arranged knife-edged support adjacent said top surface, said top and bottom surfaces being arranged between said knife-edged supports with a slight amount of clearance, and stop means on said head co-acting with a fixed stationary member for limiting the distance of the head from the carrier when the carrier is stationary.

6. In combination: at least one magnetic head having a front face adapted to co-act with a moving magnetic carrier which creates a gas pressure between said front face and said carrier when in operation, a rear face remote from said carrier and top and bottom surfaces, said bottom surface bearing on a first fixedly arranged knife-edged support, an adjustable flexible member exerting a force from one end thereof, coupling means mechanically coupling said one end of the flexible member and the rear face of the head, said force being exerted on said head against said gas pressure when the carrier is moving, said coupling means creating a component of said force which is substantially parallel to the direction of movement of the carrier and substantially perpendicular to the first knife-edged support, a second fixedly arranged knife-edged support adjacent said top turface, said top and bottom surfaces being arranged between said knife-edged supports with a slight amount of clearance, a groove in said bottom surface, said groove extending substantially at right angles to said front face and said knife-edged supports, a fixedly arranged pin extending into said groove with a slight amount of clearance and substantially preventing translational movement of said head in a direction at right angles to said groove, and stop means on said head co-acting with a fixed stationary member for limiting the distance of the head from the carrier when the carrier is stationary.

7. In combination: at least one magnetic head having a front face adapted to co-act with a moving magnetic carrier which creates a gas pressure between said front face and said carrier when in operation, and a rear face remote from said carrier and top and bottom surfaces, said bottom surface bearing on a first fixedly arranged knife-edged support, an adjustable flexible member exerting a force from one end thereof, a pressure rod mechanically coupling said one end of the flexible member and the rear face of the head, said force being exerted on said head against said gass pressure when the carrier is moving, said pressure rod being adapted to move in all directions both with respect to the flexible member and the head and creating a component of said force which is substantially parallel to the direction of movement of the carrier and substantially perpendicular to the first knife-edged support, a second fixedly arranged knife-edged support adjacent said top surface, said top and bottom surfaces being arranged between said knife-edged supports with a slight amount of clearance, a groove in said bottom surface, said groove extending substantially at right angles to said front face and said knife-edged supports, a fixedly arranged pin extending into said groove with a slight amount of clearance and substantially preventing translational movement of said head at right angles to said groove, and stop means on said head co-acting with a fixed stationary member for limiting the distance of the head from the carrier when the carrier is stationary.

8. In combination: at least one magnetic head having a front face adapted to co-act with a moving magnetic carrier which creates a gas pressure between said front face and said carrier when in operation, and a rear face remote from said carrier and top and bottom surfaces, said bottom surface bearing on a first fixedly arranged knife-edged support, an adjustable flexible member exerting a force from one end thereof, a pressure rod mechanically coupling said one end of the flexible member and the rear face of the head, said force being exerted on said head against said gas pressure when the carrier is moving, said pressure rod having a longitudinal axis lying in a plane containing the normal to the carrier surface at substantially the portion of said carrier surface which co-acts with the head and the direction of movement of the carrier at said normal, said axis making an angle to this normal and thereby creating a component of said force which is substantially parallel to the direction of movement of the carrier and substantially perpendicular to the first knife-edged support, a second fixedly arranged knife-edged support adjacent said top surface, said top and bottom surfaces being arranged between said knife-edged support with a slight amount of clearance, a groove in said bottom surface, said groove extending substantially at right angles to said front face and lying in said plane, a fixedly arranged pin extending into said groove with a slight amount of clearance and substantially preventing translational movement of said head in a direction at right angles to said groove, and stop means on said head co-acting with a fixed stationary member for limiting the distance of the head from the carrier when the carrier is stationary.

9. In combination: at least one magnetic head having a front face adapted to co-act with a moving magnetic carrier which creates a gas pressure between said front face and said carrier when in operation, and a rear face remote from said carrier, said head bearing on a fixedly arranged knife-edged support, an adjustable flexible member exerting a force from one end thereof, a pressure rod mechanically coupling said one end of the flexible member and the rear face of the head, said force being exerted on said head against said gas pressure when the carrier is moving, said pressure rod having a longitudinal axis lying in a plane containing the normal to the carrier surface at substantially the portion of said carrier which co-acts with the head and the direction of movement of the carrier at said normal, said pressure rod making an angle to this normal and thereby creating a component of said force which is substantially parallel to the direction of movement of the carrier and substantially perpendicular to the knife-edged support, fixedly arranged means co-acting with said head for preventing translational movement of said head in a direction at right angles to said plane, and stop means on said head co-acting with a fixed stationary member for limiting the distance of the head from the carrier when the carrier is stationary.

10. A mount for a magnetic head, comprising: a fixedly positioned holder having a front wall and a back wall, an aperture in said front wall having upper and lower sides, a first knife-edged support rigidly positioned on said lower side, a second knife-edged support rigidly positioned on said upper side, at least one magnetic head having a front face adapted to co-act with a moving magnetic carrier which creates a gas pressure between said front face and said carrier when in operation, upper and lower surfaces, and a rear face remote from said carrier, said head being disposed in said aperture with said lower surface bearing on the first knife-edged support, a flexible member mounted on said back wall with one end facing the rear face of the head, said flexible member exerting a force from said one end, a pressure rod mechanically coupling said one end of the flexible member and the rear face of the head, said pressure rod having a longitudinal axis lying in a plane with the normal to the carrier surface where the carrier surface co-acts with the head and the direction of movement of said carrier at said carrier, said longitudinal axis making an angle with said rear face such that the rod transmits the force from said one end of the flexible member to said head with a component which is substantially parallel to the direction of movement of the carrier and substantially perpendicular to the first knife-edged support, and stop means on said head co-acting with the rear portion of said front wall for limiting the distance of the head from the carrier when the carrier is stationary.

11. A holder as set forth in claim 10, further comprising an additional aperture in said back wall, said flexible member comprising a compression spring disposed in said additional aperture.

12. A holder as set forth in claim 11, further comprising means co-acting with said holder and said head for preventing translational movement of said head at right angles to said pressure rod.

References Cited

UNITED STATES PATENTS

| | | | |
|---|---|---|---|
| 3,198,889 | 8/1965 | Eulberg | 179—100.2 |
| 3,228,014 | 1/1966 | Scott | 340—174.1 |
| 3,292,169 | 12/1966 | D'Alessandro | 340—174.1 |

BERNARD KONICK, *Primary Examiner.*

A. I. NEUSTADT, *Assistant Examiner.*